United States Patent
Clark

[15] 3,654,492

[45] Apr. 4, 1972

[54] CODE COMMUNICATION FRAME SYNCHRONIZATION SYSTEM

[72] Inventor: James M. Clark, Cedar Grove, N.J.

[73] Assignee: International Telephone and Telegraph Corporation, Nutley, N.Y.

[22] Filed: Aug. 24, 1970

[21] Appl. No.: 66,520

[52] U.S. Cl. ..........................307/269, 178/69.5 R, 307/208, 307/209, 307/210, 325/38 A, 328/63, 340/347 R

[51] Int. Cl. ..........................H03k 5/00

[58] Field of Search ..........................307/208, 209, 210, 269; 328/63, 72; 178/66, 69.5 R; 325/30, 38 A; 340/347 R

[56] References Cited

UNITED STATES PATENTS

| | | | |
|---|---|---|---|
| 2,912,684 | 11/1959 | Steele | 325/38 A X |
| 3,267,459 | 8/1966 | Chomicki et al. | 307/209 X |
| 2,700,696 | 1/1955 | Barker | 325/38 A UX |

*Primary Examiner*—Stanley D. Miller, Jr.
*Attorney*—C. Cornell Remsen, Jr., Walter J. Baum, Paul W. Hemminger, Percy P. Lantzy, Philip M. Bolton, Isidore Togut and Charles L. Johnson, Jr.

[57] ABSTRACT

Logic circuitry converts binary intelligence into a first amplitude for a binary "1" and a second amplitude for a binary "O." This same logic circuitry converts a frame timing signal into a third amplitude half way between the first and second amplitudes. These three amplitudes are converted into, for instance, three distinct frequencies with the frequency corresponding to the third amplitude being disposed half way between the frequencies corresponding to the first and second amplitudes. After transmission, the three amplitudes are recovered. A first voltage comparator having a reference voltage equal to the third amplitude recovers the binary intelligence from which a local clock is generated with the local clock pulses being delayed to be centered in the binary digits. A pair of voltage comparators having reference voltages straddling the third amplitude, but less than the first amplitude and greater than the second amplitude and a sampling gate responding to the outputs of the pair of voltage comparators and the local clock pulses recover the frame timing signal to enable frame synchronization of the receiver with the transmitter.

11 Claims, 5 Drawing Figures

PATENTED APR 4 1972

3,654,492

INVENTOR
JAMES M. CLARK
BY Alfred C. Hill
AGENT

Fig. 2
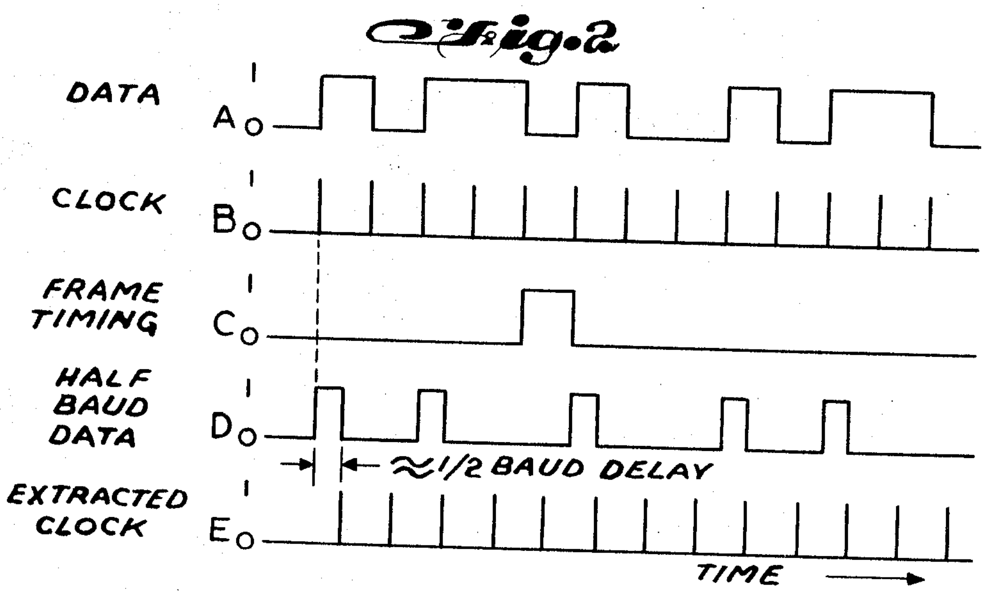
Fig. 3
| INPUT | A | B | C | F |
|---|---|---|---|---|
| FT=0,D=1 | 1 | 1 | $V_1$ | $f_o+df$ |
| FT=0,D=0 | 0 | 0 | $V_2$ | $f_o$ |
| FT=1 | 0 | 1 | $V_3$ | $f_o+1/2df$ |
Fig. 4
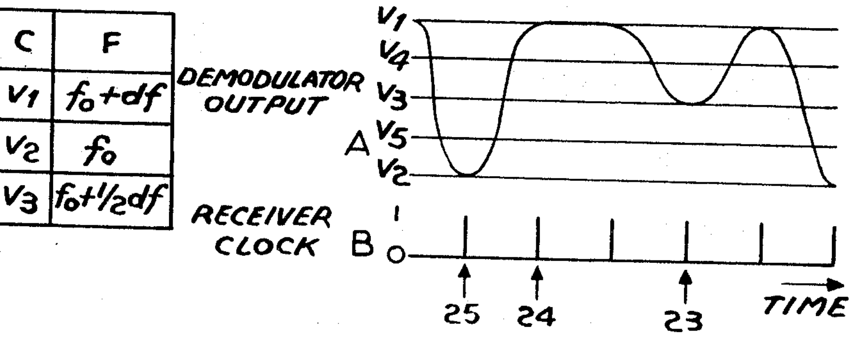
Fig. 5
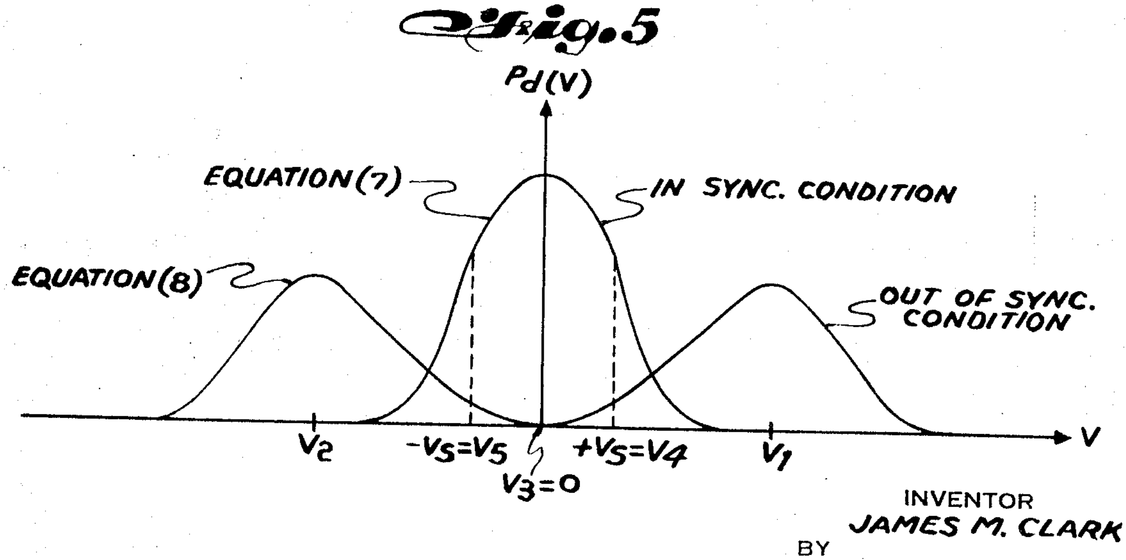
INVENTOR
JAMES M. CLARK
BY
Alfred C. Hill
AGENT

CODE COMMUNICATION FRAME SYNCHRONIZATION SYSTEM

BACKGROUND OF THE INVENTION

This invention relates to code communication systems and more particularly to methods and arrangements to synchronize code communication signals of the frequency or phase shift keyed type.

SUMMARY OF THE INVENTION

An object of the present invention is to provide another method and arrangement to synchronize a code communication system of the frequency or phase shift keyed type.

Another object of the present invention is to provide another method and arrangement to establish and maintain frame synchronization in a code communication system of the frequency or phase shift keyed type.

A further object of this invention is to provide a frequency or phase shift type code system enabling the detection of a frame synchronization signal in the received code signal when the synchronization signal is generated in accordance with the principles of the present invention by employing a pair of threshold devices and a time coincident arrangement.

A feature of the present invention is the provision of binary intelligence communication apparatus comprising a first source of binary intelligence signal; a second source of frame timing signal; first means coupled to the first and second sources responsive to the binary signal to convert one binary condition thereof to a first given amplitude and the other binary condition thereof to a second given amplitude different than the first amplitude, and responsive to the frame timing signal to provide a synchronization signal having a third given amplitude intermediate the first and second amplitudes; and second means coupled to the first means to provide a third signal for transmission having a predetermined characteristic thereof varied in a given manner to represent the first, second and third amplitudes.

Another feature of the present invention is the provision in addition to the above-mentioned components of a third means coupled to the above-mentioned second means to demodulate the third signal and recover the first, second, and third amplitudes; fourth means coupled to the third means to recover the binary signal from the demodulated third signal; and fifth means coupled to the third means to recover the synchronization signal when the amplitude of the demodulated third signal is less than a fourth amplitude and greater than a fifth amplitude, the fourth amplitude being less than the first amplitude but greater than the third amplitude and the fifth amplitude being greater than the second amplitude but less than the third amplitude.

BRIEF DESCRIPTION OF THE DRAWING

The above-mentioned and other features and objects of this invention will become more apparent by reference to the following description taken in conjunction with the accompanying drawings, in which:

FIGS. 2, 3, 4 and 5 are timing diagrams, charts and waveforms useful in explaining the operation of the system of FIG. 1.

DESCRIPTION OF THE PREFERRED EMBODIMENT

Figure 1:
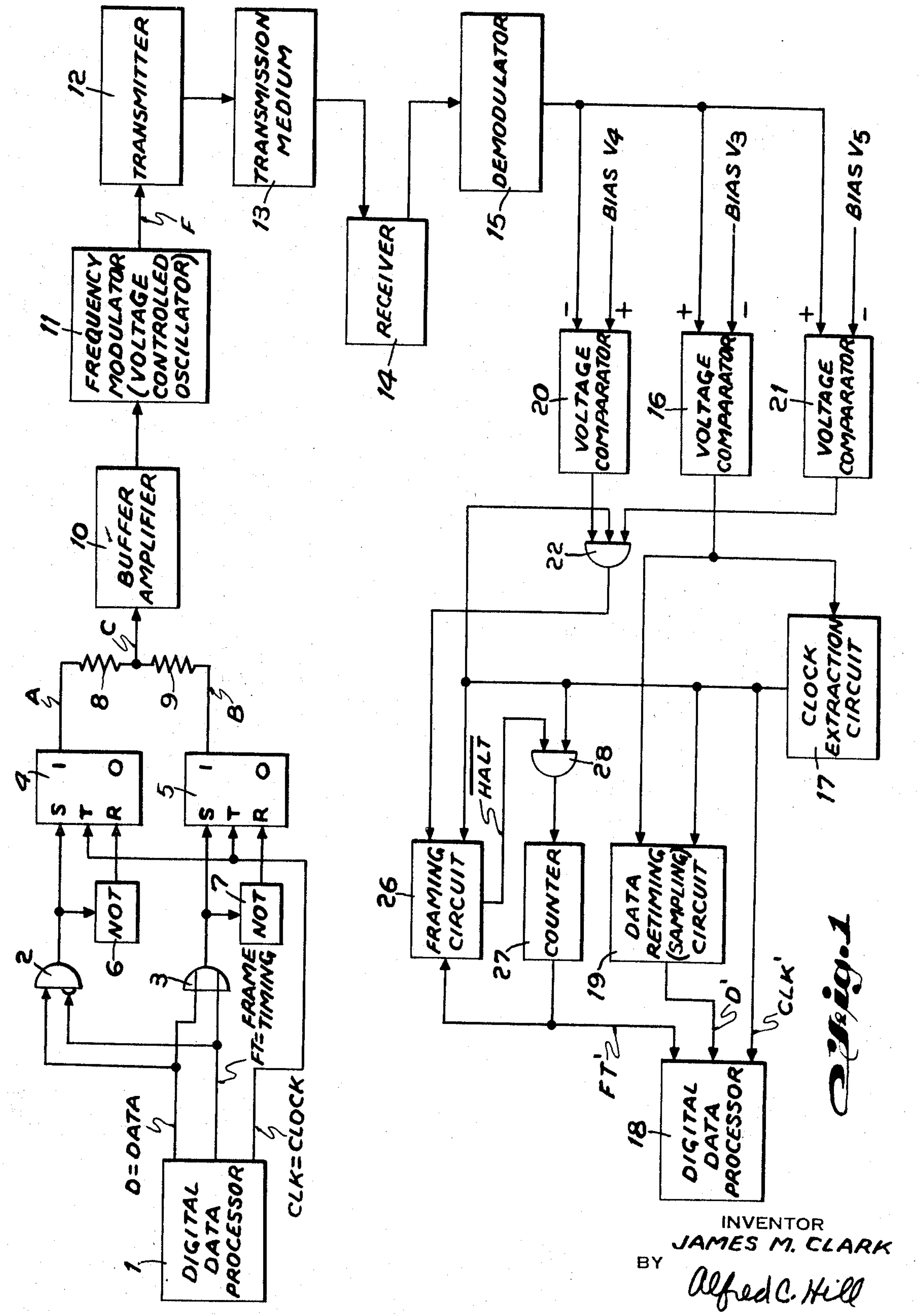
FIG. 1 is a block diagram of a code communication system in accordance with the principles of the present invention.

Referring to FIG. 1, there is illustrated therein in block diagram form a code communication system of the frequency shift keyed type employing the synchronization arrangement in accordance with the principles of this invention. Digital data processor 1 is included in the system transmitter and generates three basic signals (1) binary data identified by the letter D, and illustrated in Curve A, FIG. 2, (2) a frame timing signal identified by the symbol FT illustrated in Curve C, FIG. 2 and (3) a clock signal identified by the symbol CLK and illustrated in Curve B, FIG. 2. Processor 1 may include a source of analog intelligence coupled to a code generator to produce data D. The code generator is synchronized by a local clock from which the signal CLK is derived. The local clock operates at the bit rate of the coder and, thus, is synchronous with data D. The signal FT can be provided by a binary divider coupled to the local clock to generate a frame timing signal which occurs once per frame of the data, such as in the last bit of the frame.

The foregoing components of processor 1 would be those contained in a terminal station. However, it is possible for processor 1 to be incorporated in a repeater station. In this situation, processor 1 would then incorporate equipment illustrated to be included in the receiving half of the system of FIG. 1 and which will be described hereinbelow.

The D output of processor 1 is coupled to the normal terminal of INHIBIT 2 and also to OR 3. The output of INHIBIT 2 is coupled to the set input of flip flop 4 and the output of OR 3 is coupled to the set input of flip flop 5. In addition, the signal FT is coupled to the inhibit terminal of INHIBIT 2 and to the other input terminal of OR 3. The output of INHIBIT gate 2 also feeds NOT 6 whose output is coupled to the reset terminal of flip flop 4. The output of OR 3 is also coupled to NOT 7 whose output is coupled to the reset input of flip flop 5. The time of triggering of flip flops 4 and 5 is controlled by clock signal CLK coupled to the trigger terminals of flip flops 4 and 5.

A pair of equal valued resistors 8 and 9 are coupled in series between the "1" outputs of flip flops 4 and 5. The junction point of resistors 8 and 9 provide an output signal having a first amplitude value to represent the "1" condition of the data input, a second amplitude value, different than the first amplitude value, to represent the "0" condition of the data input, and a third amplitude value intermediate to the first and second amplitude values to represent the frame timing signal.

Since resistors 8 and 9 have equal values, the third amplitude value representing signal FT would be half way between the first and second amplitude values representing the "1" and "0" conditions of the signal D.

Referring to FIG. 3, there is illustrated therein the outputs at points A, B and C for the various input conditions to the circuit just described. When signal FT has a "0" condition and signal D has a "1" condition, the signal is passed through INHIBIT 2 to the set terminal of flip flop 4 and sets the "1" output thereof to the "1" or high condition. The "1" condition of the data signal D also is coupled through OR 3 to the set input of flip flop 5 which sets the "1" output to the "1" or high condition. Therefore, since both points A and B are high, or in the "1" condition, the output C would be equal to a maximum voltage V1. Now let us assume that input FT and the input D are in a "0" condition. In this instance, the "0" condition will be passed through INHIBIT 2, and hence, to the set input of flip flop 4 and will have no action on flip flop 4. However, the output of NOT 6 will be a "1" condition which will cause flip flop 4 to be reset and produce the "0" or low condition as its "1" output terminal. Likewise, the "0" condition of signal D is passed through OR 3 to the set input of flip flop 5 and has no effect thereon. However, the output of NOT 7 is a "1" condition which resets flip flop 5 to have a "0" or low condition at its "1" output terminal. Therefore, since points A and B are both low or on the "0" condition, the output at point C will be a minimum voltage V2. Of course, during the preceding conditions of data the signal FT has been low and does not effect the operation of INHIBIT 2 or OR 3.

Now let us consider the time of occurrence of the frame timing signal FT as shown in Curve C, FIG. 2. During this time, INHIBIT 2 is inhibited and provides a low input to the set input of flip flop 4, and a high input, due to NOT 6, to the reset input of flip flop 4. Thus, flip flop 4 is reset to provide a "0" or low condition at its "1" output terminal. The FT signal coupled through OR 3 is applied to the set input of flip flop 5 which will set flip flop 5 to provide the high or "1" condition at its "1" output terminal. In this condition, point A is low and point B is high, and, thus, the output at point C is a voltage having a value V3 which is intermediate to the values of voltages V1 and V2. Since resistors 8 and 9 are equal in value, the value of voltage V3 is half way between the values of voltages V1 and V 2.

The output from point C is coupled to buffer amplifier 10 and, hence, to modulator 11. In the case of a frequency shift keyed code system, modulator 11 would be a frequency modulator, such as a voltage controlled oscillator, to provide at the output thereof the signal at point F having the frequencies illustrated in the table of FIG. 3 for the various conditions of the data input and frame timing input. It will be observed that for a data "1" input the frequency will be $f_o + df$, for a data "0" input the frequency will be $f_o$ and for a frame timing signal input the frequency will be $f_o + \frac{1}{2}\,df$. In other words, the synchronization signal developed for transmission by frame timing signal FT is disposed one half way between the frequency for a data condition "1" and a data condition "0".

It should be pointed out at this time that the modulator 11 is illustrated to be frequency modulator only for purposes of illustration and that this modulator could just as well be a phase modulator compatible with a phase shift keyed code communication system.

The output from modulator 11 is coupled to transmitter 12 and, hence, to transmission medium 13 and then to receiver 14. Transmitter 12 and receiver 14 would be compatible with medium 13. If medium 13 is a radio propagation medium, transmitter 12 would be a radio transmitter and receiver 14 would be a radio receiver. However, if medium 13 were a wire propagation medium, transmitter 12 and receiver 14 would be a compatible wire transmitter and receiver, respectively.

The output of receiver 14 is coupled to demodulator 15 which acts upon the frequency shifted signal to recover the three amplitude levels produced at point C in the transmitter. Demodulator 15 could be a conventional frequency discriminator, or any other arrangement that will produce in response to a particular frequency a voltage related or equal to the voltage or amplitude of the signals produced at output C for the different conditions of the input signal to the gates 2 and 3.

Voltage comparator 16 has its negative input coupled to a bias voltage V3 which is equal to the amplitude present at point C representing the frame timing signal or synchronization signal transmitted. Thus, with the positive input of comparator 16 coupled to the output of demodulator 15, it is possible to detect and recover the binary signal even in the presence of noise. The output signal of demodulator 15 is noise distorted and bandwidth limited which results in a sloping transition between the amplitudes representing the binary conditions of the data signal. Due to the action of comparator 15 at the bias voltage V3, a sharper transition will be produced enabling the recovery of the binary signal with relatively steep transitions. Clock extraction circuit 17 is coupled to the output of comparator 16 and detects the bit rate of the recovered binary signal. Circuit 17 could be a phase locked loop having a delay device coupled thereto to provide clock pulses delayed one-half a digit, or bit width so that the clock pulses are disposed in the center of the received binary digits, such as illustrated in Curve E, FIG. 2. Circuit 17 could also be a monostable multivibrator triggered by the positive transitions of the recovered binary signal which then is applied to a filter to recover the bit rate. The filter output is coupled to a pulse reshaper to provide the desired clock pulses which are then delayed by one-half a digit width to position the clock pulses approximately in the center of the recovered binary digits. The output of circuit 17 is coupled to digital data processor 18 and also to data retiming circuit 19 to retime and reshape the recovered binary signal at the output of comparator 16. Thus, there is provided at the input of processor 18 retimed data D' and a clock CLK' which is synchronous with the retimed data D'. Processor 18 also receives a frame timing signal FT' in a manner now to be described.

Voltage comparator 20 has its positive input coupled to a bias voltage V4 having a value which is less than the value of V1 but greater than the value of V3 and its negative input coupled to the output of demodulator 15. Voltage comparator 21 has its negative input coupled to a bias voltage V5 having a value which is greater than the value of V2 but less than the value of V3 and its positive input coupled to the output of demodulator 15. The output of comparator 20 and 21 are coupled to AND 22. Signal CLK' at the output of circuit 17 is also coupled to AND 22 to appropriately sample at the clock time the output of comparators 20 and 21. Curve A, FIG. 4 illustrates an enlarged bandwidth limited version of the data in Curve A, FIG. 2 and Curve B, FIG. 4 illustrates the receiver clock CLK' substantially identical to the extracted clock of Curve E, FIG. 2. When the input from demodulator 15 is less than voltage V4, voltage comparator 20 produces a high output and when the input from demodulator 15 is greater than the voltage V5, voltage comparator 21 produces a high output. To extract the frame timing signal, both comparators 20 and 21 must produce a high output which will only occur when the output of demodulator 15 is within the amplitude range between V4 and V5 and a clock pulse of CLK' from circuit 17 must be present. With this arrangement, the only time that an output will occur from AND 22 is when the input to comparators 20 and 21 from demodulator 15 is at the amplitude V3, as illustrated at time 23 of FIG. 4, since this is the only time that both comparators 20 and 21 have a high output and the clock pulse is present. At all other times either the clock pulse will be absent or one of comparators 20 and 21 will produce a low output. It will be observed from FIG. 4 that during the transition of the waveform of Curve A, FIG. 4 between V4 and V5 there is no simultaneous presence of the clock pulse. When a timing pulse is present, such as pulse 24, the input to comparator 20 will be greater than the voltage V4 and, thus, a low output will be produced from comparator 20 which will block AND 22. When a timing pulse is present, such as pulse 25, the input to voltage comparator 21 will be less than the voltage V5 which will result in a low output from comparator 21 thereby blocking AND 22.

When an output is delivered by AND 22 this output is coupled to framing circuit 26 which is compared with the output from counter 27 which counts the clock pulse output of circuit 17 by way of AND 28. The output of counter 27 is the frame timing signal FT' and is advanced or retarded in its timing position by framing circuit 26 which searches for the proper synchronization or framing signal and produces a $\overline{\text{HALT}}$ signal when the proper framing signal is not detected. The $\overline{\text{HALT}}$ signal is coupled to AND 28 to prevent the coupling of clock pulses to counter 27 to adjust the timing of the output signal therefrom until framing circuit 26 decides that the proper framing signal has been detected. Framing circuit 26 may take many different forms. For instance, circuit 26 may take the form of either of the circuits disclosed in the copending applications of J. M. Clark, Ser. No. 781,181, filed Dec. 4, 1968, now U.S. Pat. No. 3,597,539 and Ser. No. 780,981, filed Dec. 4, 1968, now U.S. Pat. No. 3,594,502.

In a terminal station digital data processor 18 could be a binary decoder timed by the synchronous clock CLK' to decode the binary data D'. Of course, as will be recognized processor 18 could also be the arrangement illustrated and described hereinabove for the transmitter of FIG. 1 for use in a repeater station.

As pointed out hereinabove, a new method and arrangement of synchronizing a frequency shift keyed or phase shift keyed binary transmission system has been provided. This new method and arrangement will enable instantaneous frame acquisition when there is no noise. The basic idea is to transmit a synchronization symbol which is different from the symbols used to convey other information. When there is no noise, the synchronization symbol is detected with 100 percent certainty the first time it is received. Thus, frame acquisition is practically instantaneous if it is considered that search time begins when the first synchronization symbol is detected. As pointed out hereinabove, in a frequency shift keyed system, a frequency signal $f=+fo+b(df)$ is transmitted, where $b$ is the value of the binary digit (bit) transmitted ($b=0$ or $b=1$). For the frame synchronization technique described hereinabove there is transmitted a symbol $b=½$, that is, a frequency $fo+½\ df$ for one bit period in each frame, for instance, the last bit period of the frame. When the signal is received without noise, the symbol $b=1$ is received as a voltage V1 and the symbol $b=0$ is received as a voltage $V2=-V1$, where $V1$ is the peak signal amplitude. The synchronization symbol $b = ½$ is received as a voltage V3, where V3 is equal to zero.

In the presence of noise, assumed to be Gaussian which is generally the case, the normalized Gaussian probability density is:

$$p(x)=\frac{1}{\sqrt{2\pi}}e^{-1/2x^2} \qquad (1)$$

The normalized cumulative probability function is:

$$P(x)=\int_{-00}^{x} p(y)dy \qquad (2)$$

The probability that the normalized statistical variable occurs in the interval $a<x<b$ is:

$$\text{prob }(a<x<b)=\int_{a}^{b} p(x)dx=P(b)-P(a) \qquad (3)$$

When the statistical variable is not normalized the argument of the functions $p$ and $P$ is:

$$x=(V-u)/\sigma \qquad (4)$$

where $V$ and $\sigma$ are the mean (average), standard deviation (RMS amplitude) and variance, respectively, of the statistical variable $V$.

The probability density of a sampled signal depends on which symbol is sampled. If the "1" is sampled, the probability density is $$p_d(V)=\frac{1}{V_n}p\left(\frac{V-V_1}{V_n}\right),\text{ where } u=V_1,\ \sigma=V_n \qquad (5)$$

If a "0" is sampled, then $$p_d(V)=\frac{1}{V_n}p\left(\frac{V+V_1}{V_n}\right),\text{ where } u=-V_1\ ,\sigma=V_n \qquad (6)$$

If a "½" is sampled, then $$p_d(V)=\frac{1}{V_n}p\left(\frac{V}{Z_n}\right),\text{ where } u=0,\ \sigma=V_n \qquad (7)$$

If an equal number of "1" and "0" are sampled, each has a probability of 1/2 and the probability density function of the sampled signal is $$P_d(V)=\frac{1}{2V_n}\left[p\left(\frac{V-V_1}{V_n}\right)+p\left(\frac{V+V_1}{V_n}\right)\right] \qquad (8)$$

To acquire and maintain frame synchronization, it must be possible to decide whether sync symbols are being sampled, or data symbols are being sampled. That is, it must be decided whether the correct equation for $p_d(V)$ is equation (7), or equation (8). These functions are illustrated in FIG. 5. As illustrated in FIG. 5, the synchronization symbol can be detected by voltage comparators having threshold or reference voltages equal to $-VS=V5$ and $+VS=V4$, The the synchronization symbol is "detected" (correctly or not) if the sampled signal voltage $V$ is in the limits $$-VS<V<+VS \qquad (9)$$

It follows that for the system to operate properly, that $$0<VS<V1 \qquad (10)$$

It has been shown mathematically (1) that, the wider apart the threshold or reference voltages $V4$ and $V5$ are, the greater the probability of error in detecting the correct synchronization symbol and (2) that, the closer together these threshold or reference voltages are, the smaller the probability of error in detecting the correct synchronization symbol.

While I have described above the principles of my invention in connection with specific apparatus, it is to be clearly understood that this description is made only by way of example and not as a limitation to the scope of my invention as set forth in the objects thereof and in the accompanying claims.

I claim:

1. Binary intelligence communication apparatus comprising:
 a first source of binary intelligence signal including binary bits each having a given width occurring at a given bit rate:
 a second source of frame timing signal defining binary frame periods, each of said frame periods including a plurality of said binary bits;
 first means coupled to said first and second source responsive to said binary signal to convert one binary condition thereof to a first given amplitude having a width equal to said given width and the other binary condition thereof to a second given amplitude having a width equal to said given width, said second amplitude being different than said first amplitude and responsive to said frame timing signal to provide a frame synchronization signal having a third given amplitude intermediate said first and second amplitudes, a width equal to said given width and occupying the position of a given one of said binary bits during each of said frame periods; and
 second means coupled to said first means to provide a third signal for transmission having a predetermined characteristic thereof varied in a given manner to represent said first, second and third amplitudes.

2. Apparatus according to claim 1, wherein
 said third amplitude is half way between said first and second amplitudes.

3. Apparatus according to claim 1, wherein
 said second means includes
 third means responsive to said first amplitude to generate a signal having a first frequency, responsive to said second amplitude to generate a signal having a second frequency different than said first frequency, and responsive to said third amplitude to generate a signal having a third frequency intermediate said first and second frequencies.

4. Apparatus according to claim 3, wherein
 said third amplitude is half way between said first and second amplitudes, and
 said third frequency is half way between said first and second frequencies.

5. Apparatus according to claim 3, wherein
 said third means includes
 a voltage controlled oscillator.

6. Apparatus according to claim 1, wherein
 said first means includes
 logic circuit means.

7. Apparatus according to claim 6, wherein
 said logic circuit means includes
 first flip flop means,
 second flip flop means,
 logic components coupled between said first and second sources and said first and second flip flop means for control thereof, and
 two equal valued resistors coupled in series between the "1" outputs of said first and second flip flop means, the junction of said resistors providing said first, second and third amplitudes to control said second means.

8. Apparatus according to claim 6, wherein
 said logic circuit means includes
 a first flip flop,
 a second flip flop,
 an INHIBIT gate having its normal input coupled to said first source, its inhibit input coupled to said second source and its output coupled to the set input of said first flip flop,
 a first NOT gate coupled between the output of said INHIBIT gate and the reset input of said first flip flop, an OR gate having one input coupled to said first source the other input coupled to said second source and its output coupled to the set input of said second flip flop, a second NOT gate coupled between the output of said OR gate and the reset input of said second flip flop, and two equal valued resistors coupled in series between the "1" outputs of said first and second flip flops, the junction of said resistors providing said first, second and third amplitudes to control said second means.

9. Apparatus according to claim 1, further including third means coupled to said second means to demodulate said third signal and recover said first, second and third amplitudes;

fourth means coupled to said third means to recover said binary signal form said demodulated third signal; and fifth means coupled to said third means to recover said synchronization signal when the amplitude of said demodulated third signal is less than a fourth amplitude and greater than a fifth amplitude, said fourth amplitude being less than said first amplitude but greater than said third amplitude and said fifth amplitude being greater than said second amplitude but less than said third amplitude.

10. Apparatus according to claim 9, wherein said fourth means includes a first bias source providing a first voltage equal to said third amplitude, a first voltage comparator coupled to said third means and said first bias source to recover said binary signal, and sixth means coupled to the output of said first comparator to extract a clock signal from said recovered binary signal having said given bit rate, said clock signal being time displaced with respect to the transitions of said recovered binary signal; and said fifth means includes a second bias source providing a second voltage having an amplitude less than said first amplitude but greater than said third amplitude, a third bias source providing a third voltage having an amplitude greater than said second amplitude but less than said third amplitude, a second voltage comparator coupled to said third means and said second bias source, a third voltage comparator coupled to said third means and said third bias source, and coincident gate means coupled to the output of each of said second and third comparators and said sixth means to recover said synchronization signal.

11. Apparatus according to claim 1, wherein said first means includes a first flip flop, a second flip flop, an INHIBIT gate having its normal input coupled to said first source, its inhibit input coupled to said second source and its output coupled to the set input of said first flip flop, a first NOT gate coupled between the output of said INHIBIT gate and the reset input of said first flip flop, an OR gate having one input coupled to said first source, the other input coupled to said second source and its output coupled to the set input of said second flip flop, a second NOT gate coupled between the output of said OR gate and the reset input of said second flip flop, and two equal valued resistors coupled in series between the "1" outputs of said first and second flip flops, the junction of said resistors providing said first, second and third amplitudes to control said second means; and further including third means coupled to said second means to demodulate said third signal and recover said first, second and third amplitudes;

a first bias source providing a first voltage equal to said third amplitude;

a first voltage comparator coupled to said third means and said first bias source to recover said binary signal;

sixth means coupled to the output of said first comparator to extract a clock signal from said recovered binary signal, said clock signal being time displaced with respect to the transitions of said binary signal;

a second bias source providing a second voltage having an amplitude less than said first amplitude but greater than said third amplitude;

a third bias source providing a third voltage having an amplitude greater than said second amplitude but less than said third amplitude;

a second voltage comparator coupled to said third means and said second bias source;

a third voltage comparator coupled to said third means and said third bias source; and coincident gate means coupled to the output of each of said second and third comparators and said sixth means to recover said synchronization signal.

* * * * *